United States Patent
Yu et al.

(10) Patent No.: US 11,905,990 B2
(45) Date of Patent: Feb. 20, 2024

(54) MOTION GUIDING DEVICE AND LUBRICATION PATH COMPONENT USED IN MOTION GUIDING DEVICE

(71) Applicant: THK Co., Ltd., Tokyo (JP)

(72) Inventors: Xingjia Yu, Liaoning (CN); Yue Liu, Liaoning (CN); Tomoyuki Aida, Liaoning (CN)

(73) Assignee: THK CO., LTD., Tokyo (JP)

( * ) Notice: Subject to any disclaimer, the term of this patent is extended or adjusted under 35 U.S.C. 154(b) by 102 days.

(21) Appl. No.: 17/627,479

(22) PCT Filed: May 7, 2020

(86) PCT No.: PCT/CN2020/089004
§ 371 (c)(1),
(2) Date: Jan. 14, 2022

(87) PCT Pub. No.: WO2021/008199
PCT Pub. Date: Jan. 21, 2021

(65) Prior Publication Data
US 2022/0268314 A1    Aug. 25, 2022

(30) Foreign Application Priority Data

Jul. 15, 2019 (CN) .......................... 201910638932.1

(51) Int. Cl.
*F16C 29/06* (2006.01)
*F16C 33/66* (2006.01)

(52) U.S. Cl.
CPC ........ *F16C 29/0609* (2013.01); *F16C 29/064* (2013.01); *F16C 33/6651* (2013.01); *F16C 33/6681* (2013.01)

(58) Field of Classification Search
CPC ................ F16C 29/0609; F16C 29/064; F16C 33/6603; F16C 33/6614; F16C 33/6618;
(Continued)

(56) References Cited

U.S. PATENT DOCUMENTS

| 4,850,720 A | 7/1989 | Osawa |
| 5,727,884 A | 3/1998 | Greiner et al. |

(Continued)

FOREIGN PATENT DOCUMENTS

| CN | 2603792 Y | 2/2004 |
| CN | 1507980 A | 6/2004 |

(Continued)

OTHER PUBLICATIONS

Office Action dated Sep. 27, 2022, issued in counterpart CN application No. 202080032577.4, with English translation. (15 pages).

(Continued)

*Primary Examiner* — James Pilkington
(74) *Attorney, Agent, or Firm* — WHDA, LLP

(57) ABSTRACT

A motion guiding device includes a supporting body and a moving body. The moving body includes a moving body main body, a cover body and a circulation component. The cover body includes a first lubrication groove. The motion guiding device is further provided with a lubrication path component, the lubrication path component including a second lubrication groove having a cross-sectional area less than that of the first lubrication groove. When a lubricating oil is used as the lubricant, the lubricant is supplied by a lubricating oil lubrication path formed by the first lubrication groove and the second lubrication groove. In this way, in the motion guiding device, the lubrication path may be widened when the lubricating grease is used to lubricate, while the lubrication path may be narrowed when the lubricating oil is used to lubricate, so that a good lubrication may be easily achieved.

8 Claims, 9 Drawing Sheets

(58) Field of Classification Search
CPC ............... F16C 33/6629; F16C 33/664; F16C 33/6651; F16C 33/6655; F16C 33/6681
See application file for complete search history.

(56) References Cited

U.S. PATENT DOCUMENTS

| | | | |
|---|---|---|---|
| 7,435,000 B2* | 10/2008 | Neufang | F16C 33/6629 |
| | | | 384/15 |
| 7,473,033 B2* | 1/2009 | Chen | F16C 29/0609 |
| | | | 384/45 |
| 8,662,752 B2 | 3/2014 | Maki et al. | |
| 2008/0285899 A1 | 11/2008 | Fumoto et al. | |
| 2009/0304312 A1 | 12/2009 | Horie et al. | |
| 2012/0328221 A1 | 12/2012 | Maki et al. | |

FOREIGN PATENT DOCUMENTS

| | | |
|---|---|---|
| CN | 1641256 A | 7/2005 |
| CN | 101389874 A | 3/2009 |
| CN | 102713320 A | 10/2012 |
| CN | 105324585 A | 2/2016 |
| CN | 205780297 U | 12/2016 |
| JP | H07-317761 A | 12/1995 |
| JP | 2004-353698 A | 12/2004 |

OTHER PUBLICATIONS

International Search Report dated Aug. 5, 2020, issued in counterpart International Application No. PCT/CN2020/089004, with English Translation. (8 pages).

\* cited by examiner

MOTION GUIDING DEVICE AND LUBRICATION PATH COMPONENT USED IN MOTION GUIDING DEVICE

TECHNICAL FIELD

The present disclosure relates to a motion guiding device and a lubrication path component used in the motion guiding device, and more particularly, to a motion guiding device including a lubrication path component provided with a lubricant supply structure and the lubrication path component.

BACKGROUND

A linear guide rail, as a type of motion guiding device, includes a track as a supporting body and a moving block as a moving body movably mounted along the track. A plurality of balls as rolling elements capable of rolling are provided between the track and the moving block. The plurality of balls may circulate in an annular ball circulation path, and the ball circulation path includes: a loaded rolling path including a ball rolling groove arranged on the track and a loaded ball rolling groove arranged on the moving block and opposite to the ball rolling groove arranged on the track, a non-loaded passage arranged on the moving block and parallel to the loaded rolling path, and a U-shaped direction change path arranged on the moving block and connecting the loaded rolling path and the non-loaded passage.

In the linear guide rail described above, a lubricant supply structure for supplying a lubricant to the direction change path needs to be provided.

For example, Patent Document 1 discloses a lubricant supply structure for supplying a lubricant to a direction change path in a linear guide rail. Specifically, in the Patent Document 1, a fitting recess portion is formed on a cover body (that is, an end cover plate) serving as a part of the moving block, and the linear guide rail includes a separate member which may be fit into the fitting recess portion and which has a material hardness same as or lower than that of the end cover plate. A groove as a lubricant supply path is formed in at least one of mutually opposing joining surfaces of the fitting recess portion and the separate member, and one or more convex portions extending along the groove as the lubricant supply path are provided on at least one of the mutually opposing joining surfaces.

However, following technical problems exist in the Patent Document 1.

Specifically, when a lubricating grease is used as a lubricant, a cross-sectional area of the lubricant supply path needs to be increased and a length of the lubricant supply path needs to be reduced, while when a lubricating oil is supplied as a lubricant, the cross-sectional area of the lubricant supply path needs to be reduced and the length of the lubricant supply path needs to be reduced. If the lubricant supply path is set to have the same length, the cross-sectional area of the lubricant supply path needs to be increased when the lubricating grease is supplied, and the cross-sectional area of the lubricant supply path needs to be reduced when the lubricating oil is supplied. Therefore, when the lubricating grease is supplied and the lubricating oil is supplied, the lubricant supply path needs to have opposite cross-sectional areas. In the linear guide rail in a related art such as the Patent Document 1, the lubricant supply path needs to be designed to have an optimal cross-sectional area for achieving both a lubricating grease lubrication and a lubricating oil lubrication. However, as a consumption of lubricant is reduced in consideration of environmental influences and the like, it is difficult to design a lubricant supply path for achieving both the lubricating grease lubrication and the lubricating oil lubrication.

Patent Document 1: Japanese Patent Application Publication No. 2004-353698A

SUMMARY

The present disclosure is proposed to solve the above technical problem, and an object of the present disclosure is to provide a motion guiding device for easily achieving both a lubricating grease lubrication and a lubricating oil lubrication so as to achieve a good lubrication, and a lubrication path component used in the motion guiding device.

In order to achieve the above object, the present disclosure provides a motion guiding device including a supporting body and a moving body, wherein the supporting body includes a rolling element rolling groove formed on left and right side surfaces in a longitudinal direction, and the moving body is relatively movably assembled to the supporting body via a plurality of rolling elements, the moving body includes: a moving body main body, a cover body fixed to front and rear end surfaces of the moving body main body; and a circulation component provided between the moving body main body and the cover body, wherein the moving body main body is provided with a loaded rolling element rolling groove and a non-loaded passage, the loaded rolling element rolling groove is arranged opposite to the rolling element rolling groove so as to form a loaded rolling path for a roll of the rolling element, and the non-loaded passage is formed in parallel with the loaded rolling path and configured for the roll of the rolling element, wherein the motion guiding device is provided with a direction change path for connecting the loaded rolling path and the non-loaded passage so as to change a direction of the rolling element, the cover body is provided with an outer peripheral side direction change portion of the direction change path, the circulation component is provided with an inner peripheral side direction change portion of the direction change path, the circulation component includes a connecting portion for connecting the inner peripheral side direction change portion positioned on left and right sides of the supporting body, the cover body includes a fitting recess portion for accommodating the connecting portion, and a first lubrication groove is formed in the fitting recess portion; in response to using a lubricating grease as a lubricant, the lubricant is supplied by a lubricating grease lubrication path formed by the first lubrication groove and the circulation component; the motion guiding device is characterized in that it further includes a lubrication path component including a second lubrication groove having a cross-sectional area less than that of the first lubrication groove, the lubrication path component includes a fitting portion fitting the first lubrication groove and an insertion portion insertable into the circulation component; in response to using a lubricating oil as a lubricant, by inserting the insertion portion into the circulation component and fitting the fitting portion into the first lubrication groove, the lubricant is supplied by a lubricating oil lubrication path formed by the first lubrication groove and the second lubrication groove.

Effects of the Invention

According to the motion guiding device of the present disclosure, the lubrication path may be widen when the lubricating grease is used to lubricate, while the lubrication path may be narrowed when the lubricating oil is used to lubricate, so that a good lubrication may be easily achieved.

Further, according to the motion guiding device of the present disclosure, by inserting the insertion portion of the lubrication path component into the circulation component, the lubricating oil may easily reach the inner peripheral side direction change portion and the outer peripheral side direction change portion that constitute the direction change path, so that a good lubrication may be easily achieved.

Figure 1:
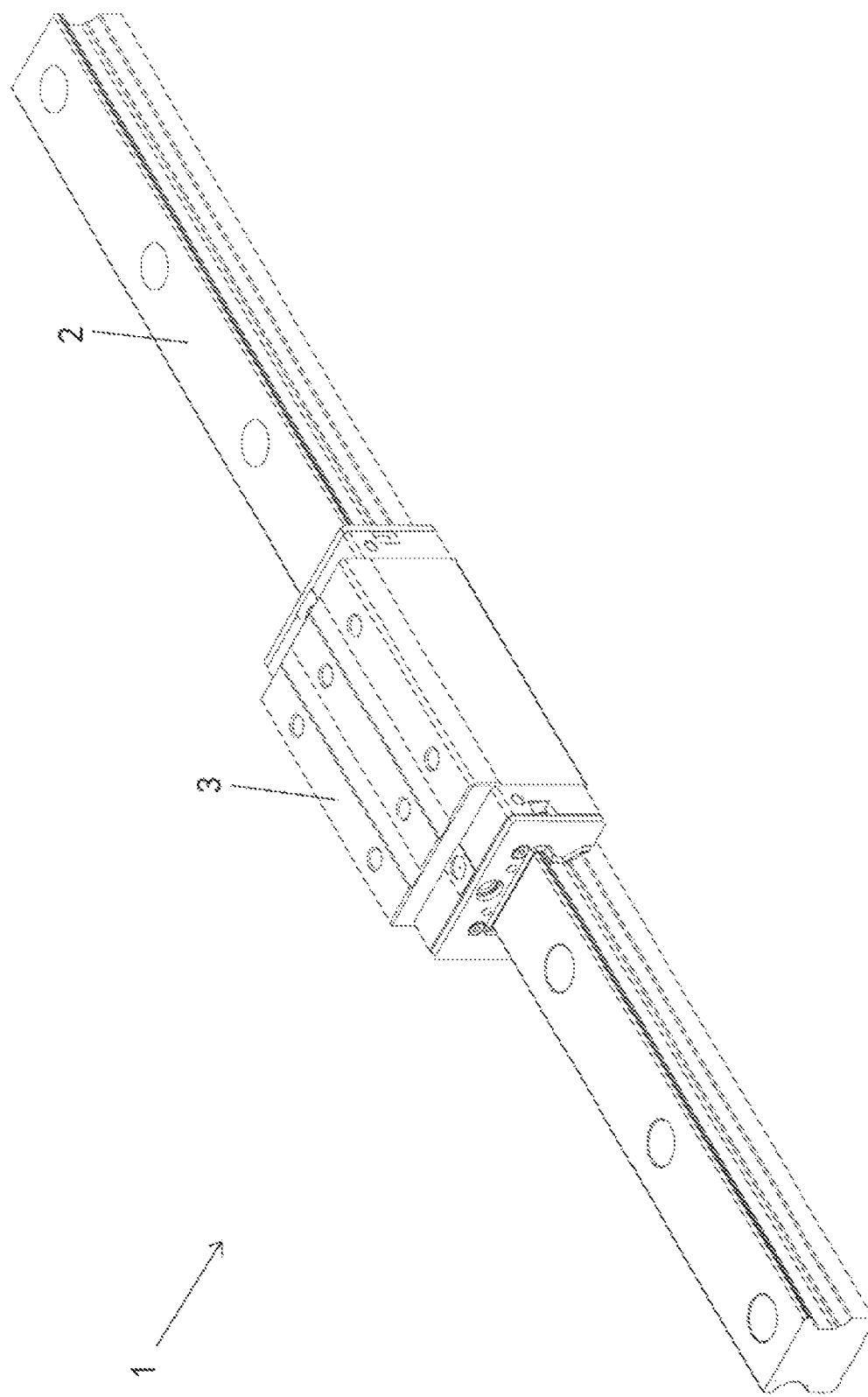
FIG. 1 is a perspective view of a motion guiding device of the present disclosure.

DESCRIPTION OF NUMERALS 1 linear guide rail (motion guiding device)
2 track (supporting body)
2a ball rolling groove
3 moving block (moving body)
3a slider (moving body main body)
3a1 loaded ball rolling groove
3a2 non-loaded passage
3b end cover plate (cover body)
3b1 lubricant supply hole
3b2 outer peripheral side direction change portion
3b3 fitting recess portion
3b4 first lubrication groove
3b41 end portion
3b5 positioning hole
4 circulation component
4a inner peripheral side direction change portion
4b connecting portion
4c third lubrication groove
5 lubrication path component
5a fitting portion
5a1 end portion
5b insertion portion
5b1 end portion
5c second lubrication groove
5d rib
5e positioning protrusion
6 ball holding member
7 dust-proof component
7a through hole
8a, 8b screw
B ball (rolling element)

DETAILED DESCRIPTION OF EMBODIMENTS

Hereinafter, the structure and function of each part of the present disclosure will be described in detail with reference to the drawings. In the following description, the same or corresponding members or structures are denoted by the same reference numerals, and redundant description thereof is omitted.

As shown in FIG. 1, a linear guide rail 1, as a type of motion guiding device, includes a track 2 as a supporting body and a moving block 3 as a moving body movably mounted along the track 2. The moving block 3 may relatively linearly move in a longitudinal direction of the track 2. Further, the track 2 is mounted to a fixed side of a base or the like, and the moving block 3 is used to mount a guided object such as a worktable.

Figure 2:
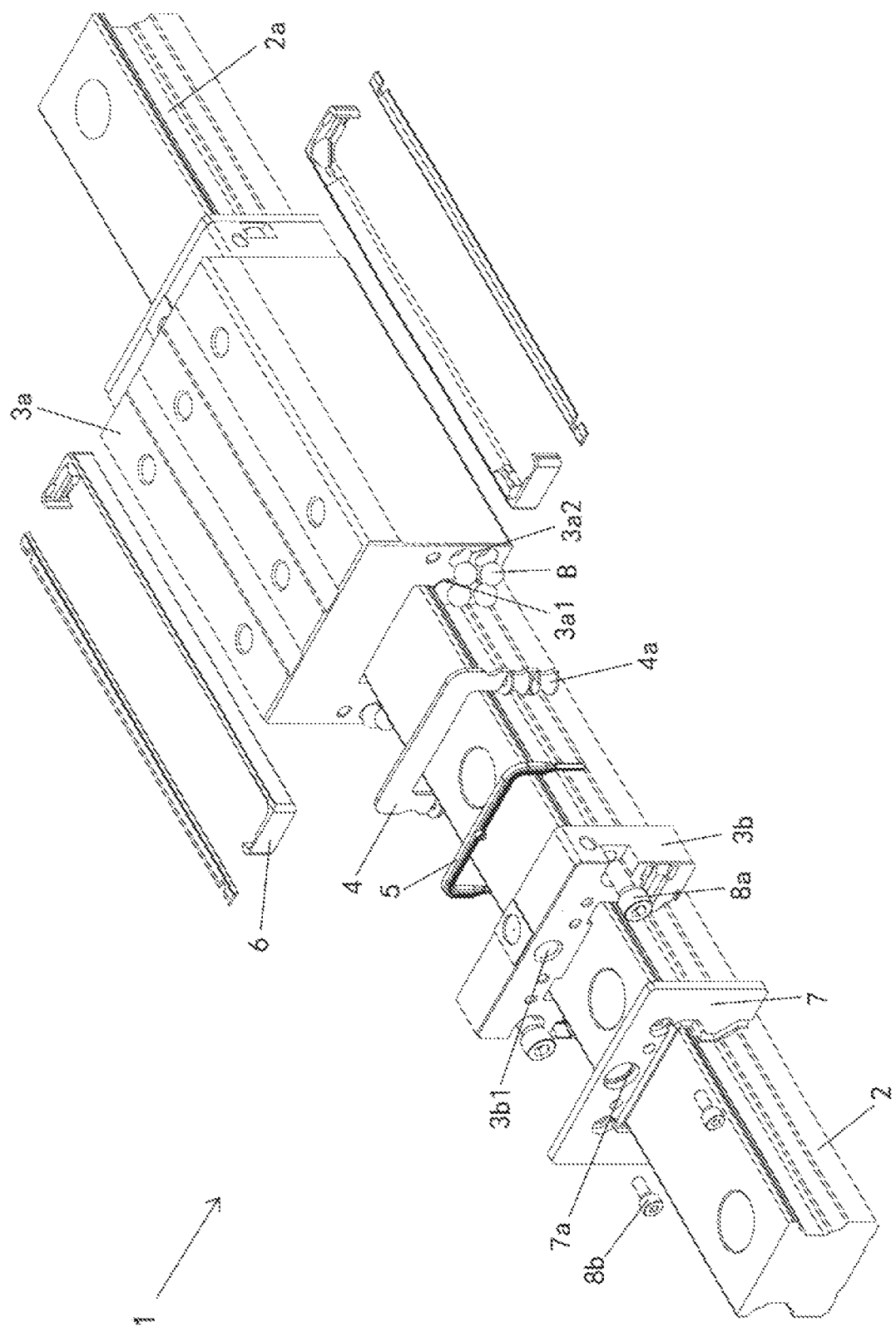
FIG. 2 is an exploded perspective view of the motion guiding device of the present disclosure.

Next, FIG. 2 is an exploded perspective view of the linear guide rail 1 of the present disclosure. Hereinafter, the linear guide rail 1 of the present disclosure will be described in detail with reference to FIG. 2.

As shown in FIG. 2, the linear guide rail 1 includes a track 2 and a moving block 3. The track 2 includes ball rolling grooves 2a which are respectively formed on left and right side surfaces in a longitudinal direction of the track. The moving block 3 is relatively movably assembled to the track 2 via a plurality of balls B as rolling elements. The moving block 3 includes: a slider 3a as a moving body main body, and an end cover plate 3b as a cover body. The slider 3a is provided with a loaded ball rolling groove 3a1 and a non-loaded passage 3a2. The end cover plate 3b is fixed to front and rear end surfaces of the slider 3a. It should be noted that the term "left and right" as used herein refers to left and right positions with respect to a center of the track 2 when the track 2 is viewed from the longitudinal direction, and the same applies to the following description. Further, the loaded ball rolling groove 3a1 of the slider 3a is arranged opposite to the ball rolling groove 2a of the track 2 so as to form a loaded rolling path for a roll of the ball B, and the non-loaded passage 3a2 of the slider 3a is formed in parallel with the loaded rolling path and is used for the roll of the ball B.

Further, as shown in FIG. 2, a ball holding member 6 is provided between the track 2 and the moving block 3 to hold the ball B. The ball holding member 6 is arranged between upper and lower rows of balls B, and includes a ball holding portion that is formed in a plate shape extending in the longitudinal direction of the track 2 and that is orthogonal to the longitudinal direction. The ball holding portion may simultaneously hold the upper and lower rows of balls B.

Moreover, as shown in FIG. 2 and FIG. 4(*a*) to be described later, the end cover plate 3*b* includes an outer peripheral side direction change portion 3*b*2, a circulation component 4 is provided between the slider 3*a* and the end cover plate 3*b*, and the circulation component 4 includes an inner peripheral side direction change portion 4*a*. Thus, the outer peripheral side direction change portion 3*b*2 of the end cover plate 3*b* and the inner peripheral side direction change portion 4*a* of the circulation component 4 constitute a U-shaped direction change path, which is used to connect the loaded rolling path and the non-loaded passage 3*a*2 so as to change a direction of the ball B. In this way, the moving block 3 may move linearly and freely along the track 2. As shown in FIG. 2, a screw 8*a* is a member for screwing and fixing the end cover plate 3*b* and the circulation component 4 to the slider 3*a*.

Further, as shown in FIG. 2, a dust-proof component 7 is provided outside the end cover plate 3*b* provided on the front and rear end surfaces of the slider 3*a*, and a through hole 7*a* is provided in the dust-proof component 7. A lubricant supply nozzle of a lubricant supply mechanism (not shown) for supplying a lubricant to the linear guide rail 1 is connected to the through hole 7*a*, and the through hole 7*a* is in communication with a lubricant supply hole 3*b*1 formed on the end cover plate 3*b*, so that the lubricant supply mechanism may supply a lubricant to the direction change path via the lubricant lubrication path provided on the end cover plate 3*b*, so as to lubricate the ball B rolling in the direction change path, the loaded rolling path, and the non-loaded passage 3*a*2. Further, as shown in FIG. 2, the screw 8*b* is a member for screwing and fixing the dust-proof component 7 to the end cover plate 3*b*.

Further, as shown in FIG. 4(*a*), the first lubrication groove 3*b*4 of the end cover plate 3*b* is in communication with the direction change paths of the linear guide rail 1 positioned on the left and right sides of the track 2 relative to the longitudinal direction, respectively. Thus, when the lubricant supply mechanism is used to supply a lubricant to the lubricant supply hole 3*b*1 via the through hole 7*a* in the dust-proof component 7, the lubricant may be supplied to the direction change paths on the left and right sides of the track 2 via the first lubricant groove 3*b*4, respectively.

Hereinafter, a lubricating grease lubrication path through which the lubricant supply mechanism supplies a lubricating grease as the lubricant in the linear guide rail 1 of the present disclosure will be described in detail with reference to FIG. 3 to FIG. 5(*c*).

Figure 3:
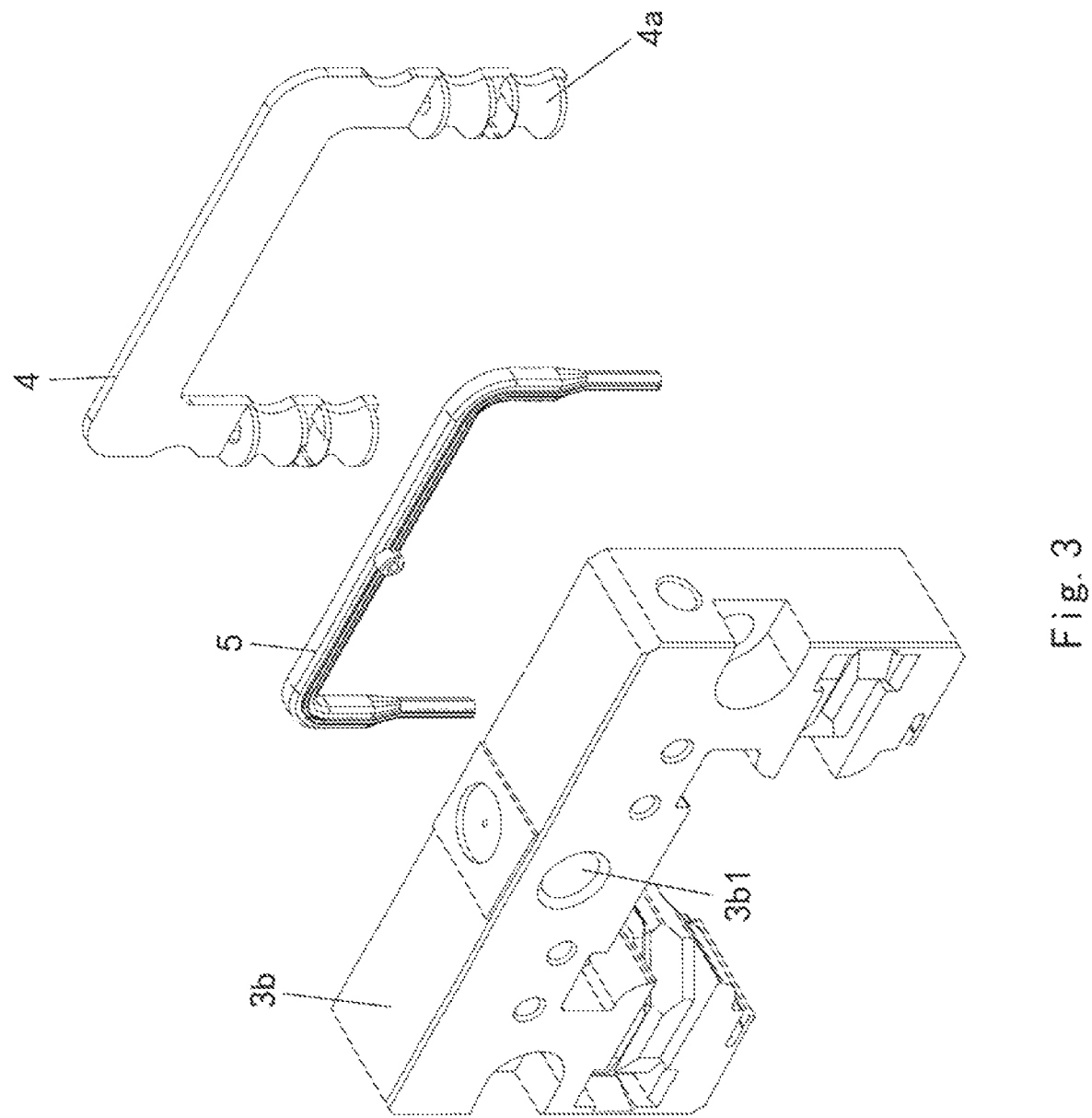
FIG. 3 is an exploded perspective view of a cover body, a lubrication path component, and a circulation component in FIG. 2.
Figure 4A:
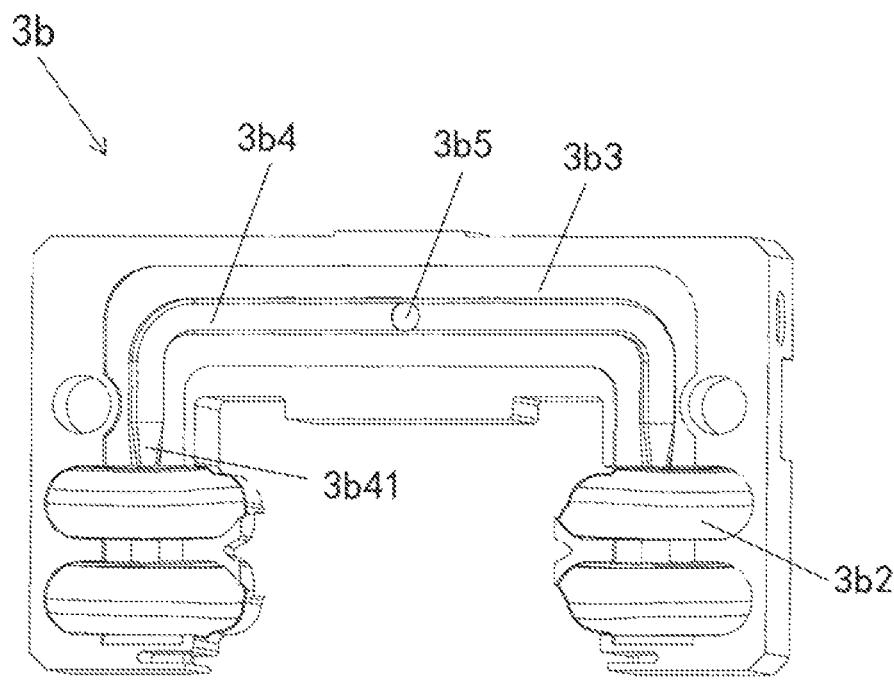
FIG. 4(a) is a perspective view of the cover body in FIG. 3.
Figure 4B:
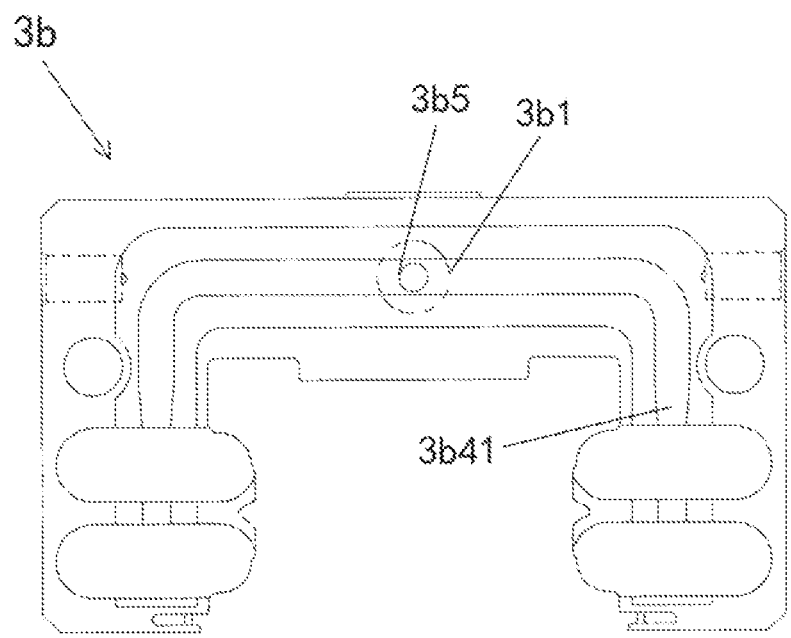
FIG. 4(b) is a front view of the cover body in FIG. 4(a).
Figure 5A:
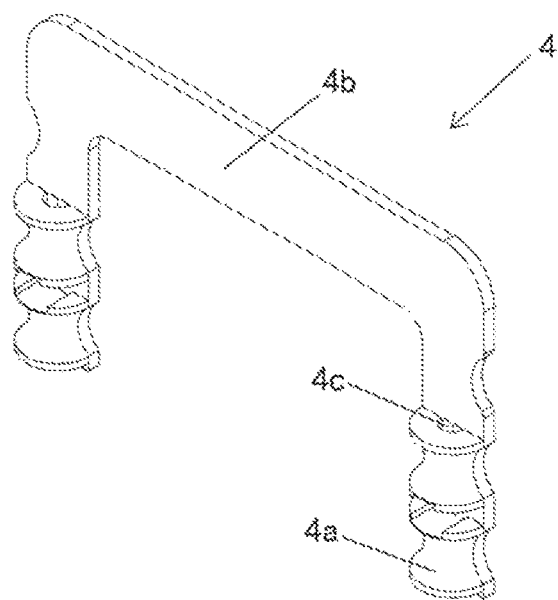
FIG. 5(a) is a perspective view of the circulation component in FIG. 3.
Figure 5B:
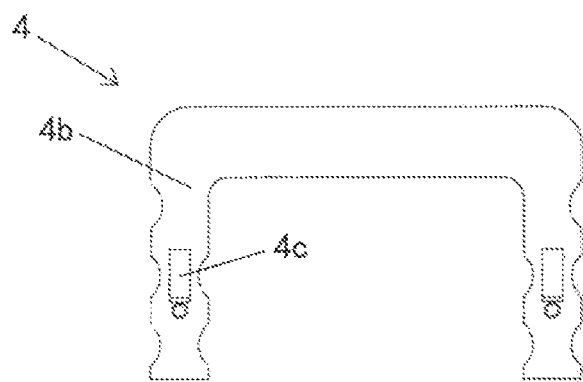
FIG. 5(b) is a rear view of the circulation component in FIG. 5(a)
Figure 5C:
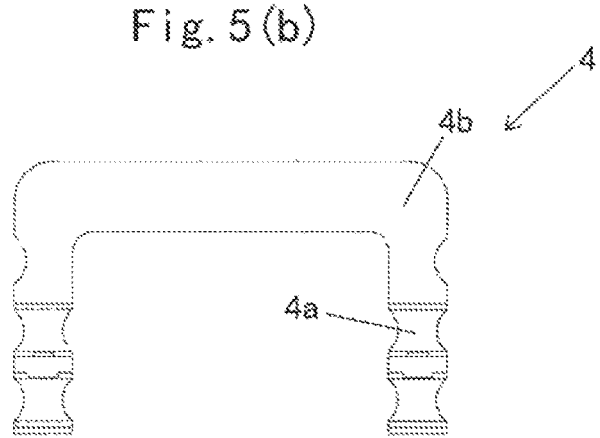
FIG. 5(c) is a front view of the circulation component in FIG. 5(a).

As shown in FIG. 3 to FIG. 5(*c*), the circulation component 4 includes a connecting portion 4*b* for connecting the inner peripheral side direction change portions 4*a* positioned on the left and right sides of the track 2, the end cover plate 3*b* includes a fitting recess portion 3*b*3 for accommodating the connecting portion 4*b*, and a first lubrication groove 3*b*4 is formed in the fitting recess portion 3*b*3.

When the circulation component 4 is directly mounted to the end cover plate 3*b*, specifically, the connecting portion 4*b* of the circulation component 4 is fitted in the fitting recess portion 3*b*3 of the end cover plate 3*b*, and the inner peripheral side direction change portion 4*a* of the circulation component 4 and the outer peripheral side direction change portion 3*b*2 of the end cover plate 3*b* constitute a U-shaped direction change path. In this case, the lubricating grease is used as the lubricant to lubricate the linear guide rail 1, and the lubricating grease is supplied to a lubricating grease lubrication path formed by the first lubrication groove 3*b*4 and the circulation component 4, so as to lubricate the ball B rolling in the direction change path, the loaded rolling path, and the non-loaded passage 3*a*2.

It should be noted that, as shown in FIG. 5(*a*) and FIG. 5(*b*), the circulation component 4 includes a third lubrication groove 4*c* connected to the first lubrication groove 3*b*4, and the third lubrication groove 4*c* is formed at least in a portion of the circulation component 4 opposite to an upper inner peripheral side direction change portion 4*a*. Thus, when the lubricating grease is supplied to the lubricating grease lubrication path formed by the first grease groove 3*b*4 and the circulation component 4, the lubricating grease may flow to the third lubrication groove 4*c* after passing through the first lubrication groove 3*b*4, and is further guided from the third lubrication groove 4*c* to a position between the upper inner peripheral side direction change portion 4*a* and a lower inner peripheral side direction change portion 4*a*, thereby reliably reaching the upper inner peripheral side direction change portion 4*a* and the lower inner peripheral side direction change portion 4*a* of the circulation component 4 to lubricate the ball B. It should be noted that, in order to allow the lubricating grease to uniformly flow to the upper inner peripheral side direction change portion 4*a* and the lower inner peripheral side direction change portion 4*a*, an opening of the upper inner peripheral side direction change portion 4*a* may have a width different from that of an opening of the lower inner peripheral side direction change portion 4*a*.

Next, a lubricating oil lubrication path through which the lubricant supply mechanism supplies the lubricating oil as the lubricant in the linear guide rail 1 of the present disclosure will be described in detail with reference to FIG. 3, FIG. 6(*a*) to FIG. 6(*c*), and FIG. 7(*a*) to FIG. 7(*d*).

As shown in FIG. 3, the lubrication path component 5 is provided between the end cover plate 3*b* and the circulation component 4.

Further, FIG. 6(*a*) is a perspective view of a first embodiment of the lubrication path component 5 in FIG. 3, FIG. 6(*b*) is a sectional view of an A-A section in FIG. 6(*a*), and FIG. 6(*c*) is a sectional view of a B-B section in FIG. 6(*a*).

As shown in FIG. 6(*a*), the lubrication path component 5 includes a fitting portion 5*a* fitting the first lubrication groove 3*b*4 and an insertion portion 5*b* insertable into the circulation component 4, and the lubrication path component 5 includes a second lubrication groove 5*c* having a cross-sectional area less than that of the first lubrication groove 3*b*4. More specifically, the insertion portion 5*b* is a portion insertable into the third lubrication groove 4*c* of the circulation component 4, and the second lubrication groove 5*c* is formed in the fitting portion 5*a* and the insertion portion 5*c*.

When the circulation component 4 is mounted to the end cover plate 3*b* via the lubrication path component 5, specifically, the insertion portion 5*b* of the lubrication path component 5 is inserted into the third lubrication groove 4*c* of the circulation component 4, the fitting portion 5*a* of the lubrication path component 5 is fitted to the first lubrication groove 3*b*4 in such a manner that the second lubrication groove 5*c* of the fitting portion 5*a* is arranged opposite to the first lubrication groove 3*b*4 of the end cover plate 3*b*, the connecting portion 4*b* of the circulation component 4 is fitted to the fitting recess portion 3*b*3 of the end cover plate 3*b*, and the inner peripheral side direction change portion 4*a* of the circulation component 4 and the outer peripheral side direction change portion 3b2 of the end cover plate 3b constitute a U-shaped direction change path. In this case, the lubricating oil may be used as the lubricant to lubricate the linear guide rail 1, and the lubricating oil is supplied to the lubricating oil lubrication path formed by the first lubrication groove 3b4 and the second lubrication groove 5c, so as to lubricate the ball B rolling in the direction change path, the loaded rolling path, and the non-loaded passage 3a2.

In this way, in the linear guide rail 1 of the present disclosure, the lubrication path may be widen when the lubricating grease is used to lubricate, while the lubrication path may be narrowed by providing the lubrication path component 5 as described above when the lubricating oil is used to lubricate, so that a good lubrication may be easily achieved.

It should be noted that the third lubrication groove 4c of the circulation component 4 shown in FIG. 5(a) and FIG. 5(b) is further connected to the second lubrication groove 5c of the lubrication path component 5. Thus, when the lubricating oil is supplied to the lubricating oil lubrication path formed by the first lubrication groove 3b4 and the second lubrication groove 5c, the lubricating oil may flow to the third lubrication groove 4c after passing through the first lubrication groove 3b4 and the second lubrication groove 5c arranged opposite to each other, and is further guided from the third lubrication groove 4c to a position between the upper inner peripheral side direction change portion 4a and the lower inner peripheral side direction change portion 4a, thereby reliably reaching the upper inner peripheral side direction change portion 4a and the lower inner peripheral side direction change portion 4a of the circulation component 4 to lubricate the ball B.

In other words, in the linear guide rail 1 of the present disclosure, by inserting the insertion portion 5b of the lubrication path component 5 into the third lubrication groove 4c of the circulation component 4, the lubricating oil may easily reach the inner peripheral side direction change portion 4a and the outer peripheral side direction change portion 3b2 that constitute the direction change path, so that a good lubrication may be easily achieved.

Figure 6A:
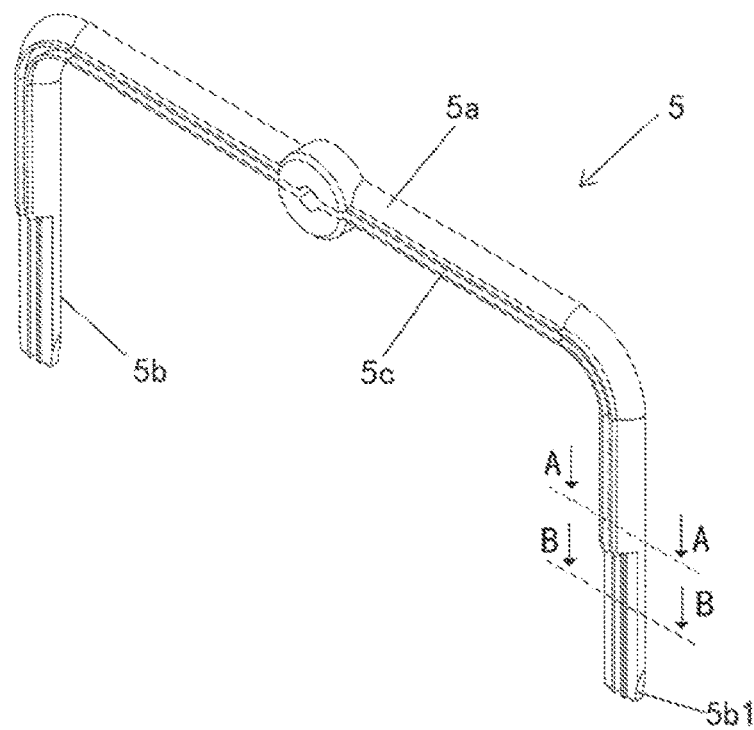
FIG. 6(a) is a perspective view of a first embodiment of the lubrication path component in FIG. 3.
Figure 6B:
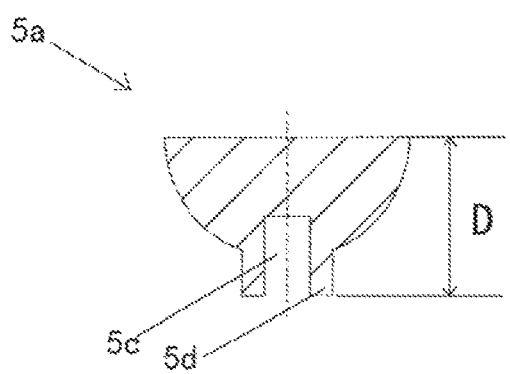
FIG. 6(b) is a sectional view of an A-A section in FIG. 6(a)
Figure 6C:
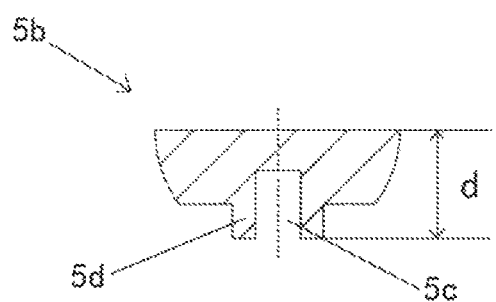
FIG. 6(c) is a sectional view of a B-B section in FIG. 6(a).

Further, as shown in FIG. 2, FIG. 6(b) and FIG. 6(c), a thickness d of the insertion portion 5b of the lubrication path component 5 is formed less than a thickness D of the fitting portion 5a of the lubrication path component 5 when viewed in the longitudinal direction of the track 2.

In this way, the insertion portion 5b of the lubrication path component 5 may be easily inserted into the third lubrication groove 4c of the circulation component 4.

Further, as shown in FIG. 6(a), a chamfer is formed on a side surface of the end portion 5b1 of the insertion portion 5b of the lubrication path component 5.

It should be noted that, although not shown, a chamfer may be formed on a front surface (i.e., a surface on which the second lubrication groove 5c is formed) of the end portion 5b1 of the insertion portion 5b of the lubrication path component 5.

Certainly, although not shown, a chamfer may be formed on both the side surface and the front surface of the end portion 5b1 of the insertion portion 5b of the lubrication path component 5.

In this way, the insertion portion 5b of the lubrication path component 5 may be more easily inserted into the third lubrication groove 4c of the circulation component 4.

Further, as shown in FIG. 6(b) and FIG. 6(c), a rib 5d for preventing a leakage of the lubricating oil is formed on both sides of the second lubrication groove 5c of the lubrication path component 5.

The first embodiment of the lubrication path component 5 according to the present disclosure has been described above.

Next, a second embodiment of the lubrication path component 5 according to the present disclosure will be described with reference to FIG. 7(a) to FIG. 7(d).

It should be noted that members and structures in the second embodiment of the lubrication path component 5 that are the same as or corresponding to those of the first embodiment are denoted by the same reference numerals, and redundant description thereof is omitted.

Figure 7A:
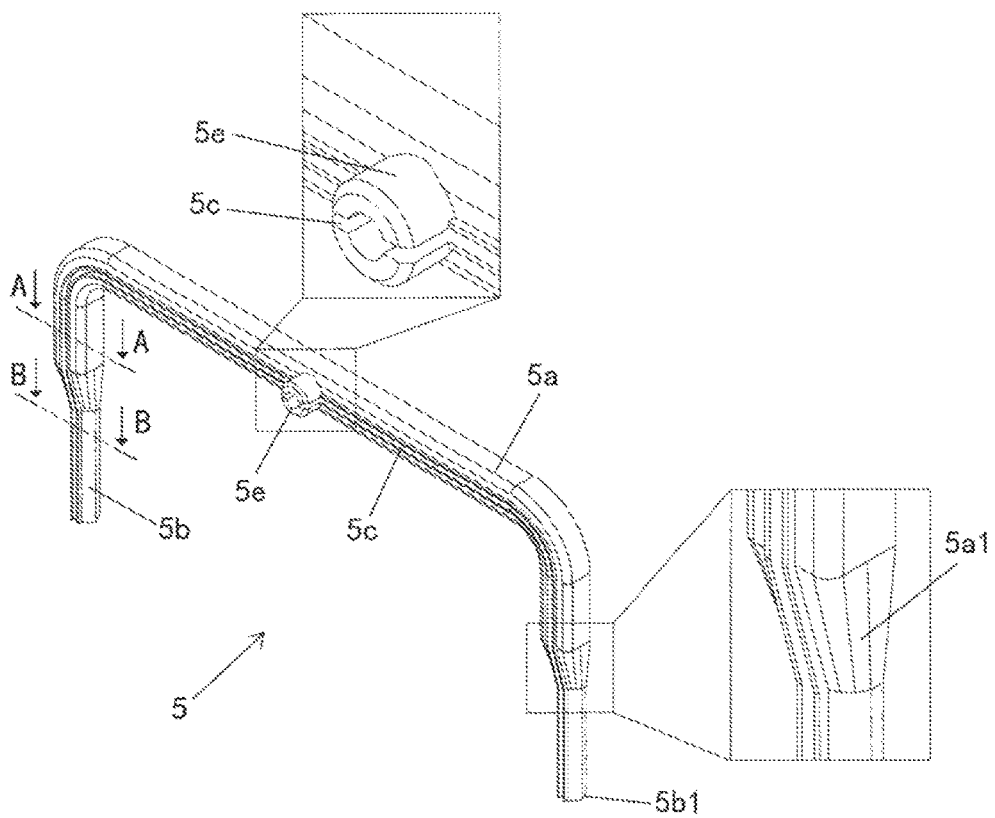
FIG. 7(a) is a perspective view of a second embodiment of the lubrication path component in FIG. 3, in which an enlarged view shows an end portion of a fitting portion and a positioning protrusion of the lubrication path component.
Figure 7B:
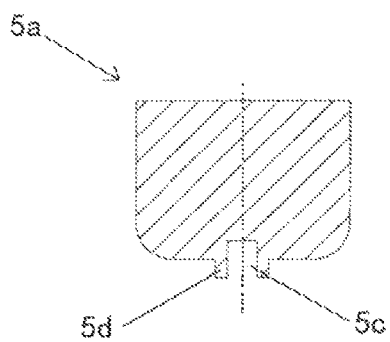
FIG. 7(b) is a sectional view of an A-A section in FIG. 7(a)
Figure 7C:
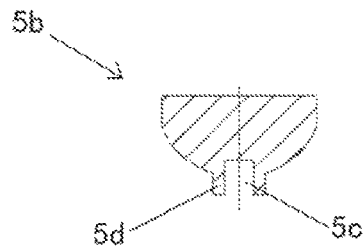
FIG. 7(c) is a sectional view of a B-B section in FIG. 7(a)
Figure 7D:
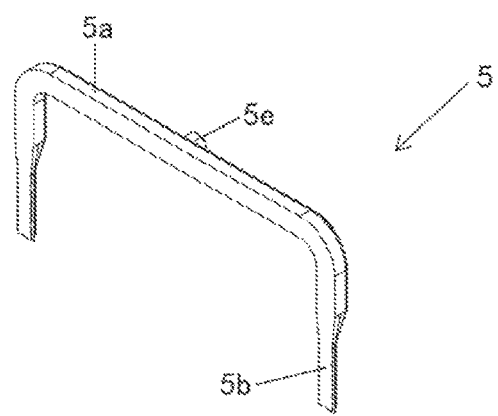
FIG. 7(d) is a perspective view when viewed from the back side of FIG. 7(a).

FIG. 7(a) is a perspective view of a second embodiment of the lubrication path component 5 in FIG. 3, in which the enlarged view shows an end portion 5a1 of the fitting portion 5a and a positioning protrusion 5e of the lubrication path component 5, FIG. 7(b) is a sectional view of an A-A section in FIG. 7(a), FIG. 7(c) is a sectional view of a B-B section in FIG. 7(a), and FIG. 7(d) is a perspective view when viewed from the back side of FIG. 7(a).

As shown in FIG. 7(a) to FIG. 7(d), same as the first embodiment, the lubrication path component 5 of the second embodiment also includes a fitting portion 5a, an insertion portion 5b, a second lubrication groove 5c and a rib 5d.

As shown in FIG. 7(a), the lubrication path component 5 of the second embodiment differs from the lubrication path component 5 of the first embodiment in a shape of the end portion 5a1 of the fitting portion 5a.

Specifically, as shown in FIG. 4(a) and FIG. 4(b), an end portion 3b41 of the first lubrication groove 3b4 of the end cover plate 3b connected to the outer peripheral side direction change portion 3b2 is formed in a tapered shape. Accordingly, as shown in FIG. 7(a), the end portion 5a1 of the fitting portion 5a of the lubrication path component 5 connected to the insertion portion 5b is formed in a tapered shape corresponding to the tapered shape of the end portion 3b41.

It should be noted that, by forming the end portion 3b41 of the first lubrication groove 3b4 of the end cover plate 3b connected to the outer peripheral side direction change portion 3b2 into the tapered shape, when the lubricating grease is used to lubricate and flows into the direction change path, a pressure of the lubricating grease may be increased, so that a better lubrication may be achieved.

Further, as shown in FIG. 7(a), the lubrication path component 5 of the second embodiment differs from the lubrication path component 5 of the first embodiment in that it further includes a positioning protrusion 5e.

Specifically, as shown in FIG. 7(a), the lubrication path component 5 includes the positioning protrusion 5e for positioning at the end cover plate 3b. Accordingly, as shown in FIG. 4(a) and FIG. 4(b), the end cover plate 3b includes a positioning hole 3b5 for fitting the positioning protrusion 5e.

In the linear guide rail 1 of the present disclosure, by providing the positioning protrusion 5e and the positioning hole 3b5 as described above, the lubrication path component 5 and the end cover plate 3b may be easily positioned when the lubrication path component 5 is fitted and inserted into the end cover plate 3b.

Further, as shown in FIG. 7(a), a part of the second lubrication groove 5c is formed in the positioning protrusion 5e.

In this way, when the positioning protrusion 5e is inserted into the positioning hole 3b5 of the end cover plate 3b, the positioning protrusion 5e may be easily deformed and inserted into the positioning hole 3b5.

It should be noted that, as shown in FIG. 7(a), a chamfer is also formed on a side surface of the end portion 5b1 of the insertion portion 5b of the lubrication path component 5 of the second embodiment.

It should be noted that, although not shown, a chamfer may be formed on a front surface (i.e., a surface on which the second lubrication groove 5c is formed) of the end portion 5b1 of the insertion portion 5b of the lubrication path component 5.

Certainly, although not shown, a chamfer may be formed on both the side surface and the front surface of the end portion 5b1 of the insertion portion 5b of the lubrication path component 5.

In this way, the insertion portion 5b of the lubrication path component 5 of the second embodiment may be more easily inserted into the third lubrication groove 4c of the circulation component 4, as the lubrication path component 5 of the first embodiment does.

The second embodiment of the lubrication path component 5 according to the present disclosure has been described above.

Next, an assembly formed by assembling the lubrication path component 5 of the second embodiment to the circulation component 4 shown in FIG. 5(a) will be described with reference to FIG. 8.

Figure 8:
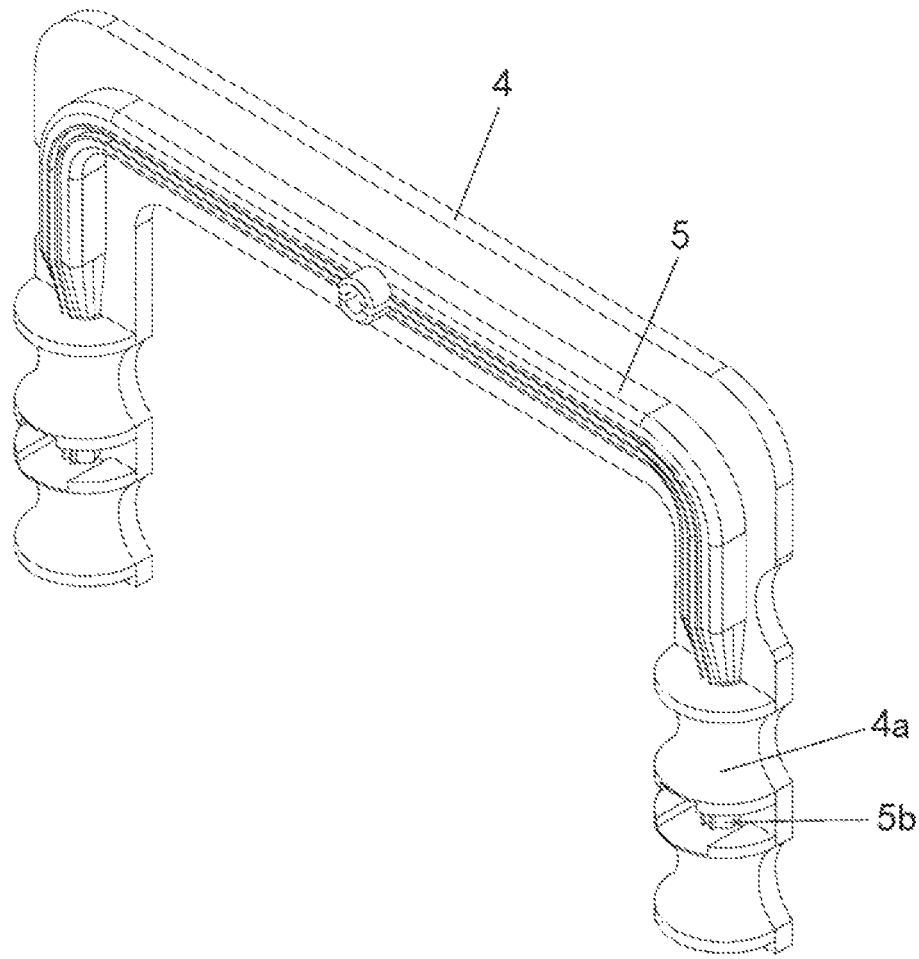
FIG. 8 is a perspective view that shows a state in which the lubrication path component of the second embodiment shown in FIG. 7(a) is assembled to the circulation component shown in FIG. 5(a).

As shown in FIG. 8, the insertion portion 5b of the lubrication path component 5 is inserted into the third lubrication groove 4c of the circulation component 4, and the end portion of the insertion portion 5b reaches a position between the upper and lower inner peripheral side direction change portions 4a of the circulation component 4. In this case, in order to ensure a stable supply of the lubricating oil when the lubricating oil is supplied, it is preferred to make a joint portion between the lubrication path component 5 and the circulation component 4 in close contact without a gap, so as to avoid a misalignment and a shaking between the lubrication path component 5 and the circulation component 4.

It should be noted that an assembly formed by assembling the lubrication path component 5 of the first embodiment to the circulation component 4 shown in FIG. 5(a) is substantially the same as the assembly shown in FIG. 8, and has the same state in that the end portion 5b1 of the insertion portion 5b reaches a position between the upper and lower inner peripheral side direction change portions 4a of the circulation component 4 and the joint portion between the lubrication path component 5 and the circulation component 4 is in close contact without a gap.

Next, an assembled state of the end cover plate 3b, the lubrication path component 5 and the circulation component 4 will be described with reference to FIG. 9(a) to FIG. 9(c).

Figure 9A:
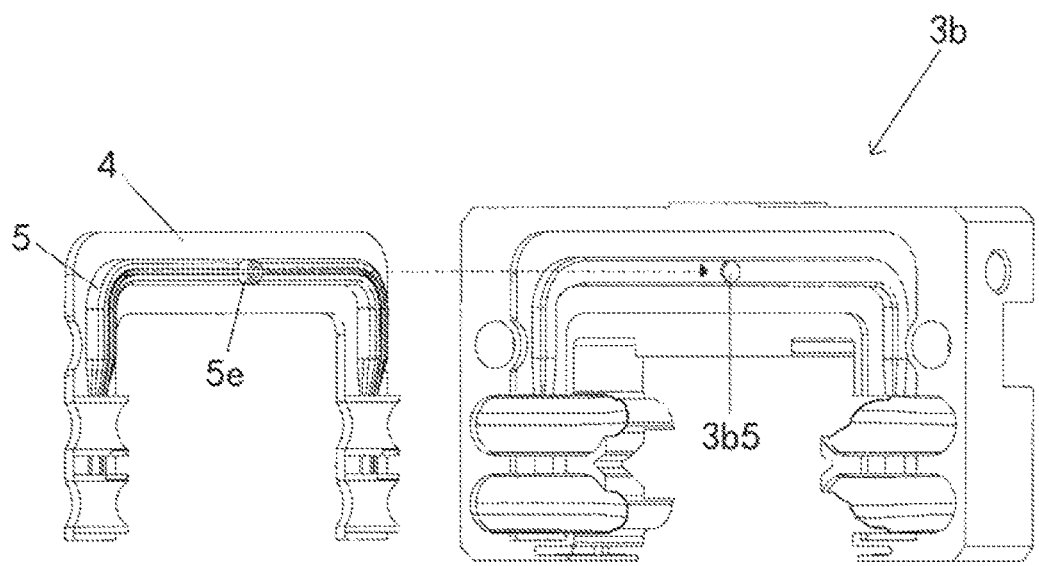
FIG. 9(a) is a diagram that shows a state before an assembly of the lubrication path component and the circulation component shown in FIG. 8 is assembled to the cover body shown in FIG. 4(a)
Figure 9B:
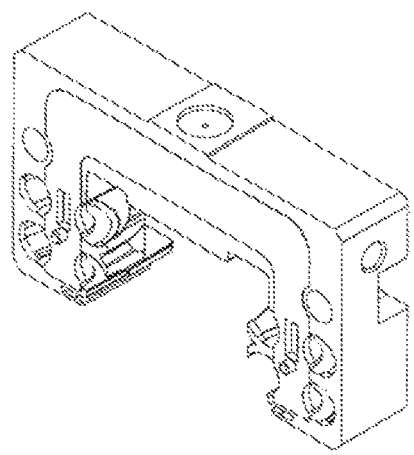
FIG. 9(b) is a diagram that shows a state after the assembly of the lubrication path component and the circulation component shown in FIG. 8 is assembled to the cover body shown in FIG. 4(a)

FIG. 9(a) is a diagram that shows a state before the assembly of the lubrication path component 5 and the circulation component 4 shown in FIG. 8 is assembled to the end cover plate 3b shown in FIG. 4(a). When the assembly of the lubrication path component 5 and the circulation component 4 shown in FIG. 8 is assembled to the end cover plate 3b shown in FIG. 4(a), the assembling may be performed in such a manner that the positioning protrusion 5e of the lubrication path component 5 is aligned with the positioning hole 3b5 of the end cover plate 3b, so that an assembly of the end cover plate 3b, the lubrication path component 5, and the circulation component 4 shown in FIG. 9(b) may be easily obtained.

Figure 9C:
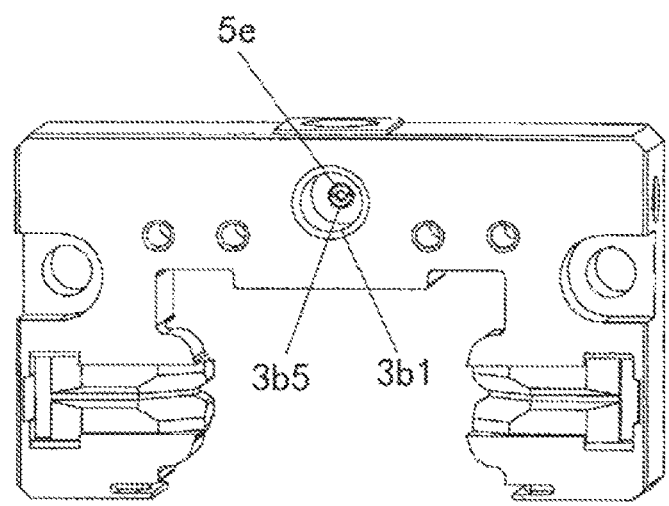
FIG. 9(c) is a diagram obtained when viewed from the back side of an assembly of the cover body, the lubrication path component and the circulation component shown in FIG. 9(b), which shows a state in that the positioning protrusion of the lubrication path component is inserted into the positioning hole of the cover body.

Further, as shown in FIG. 9(c) and FIG. 4(b), a center of the positioning hole 3b5 of the end cover plate 3b coincides with a center of the lubricant supply hole 3b1 of the end cover plate 3b.

In this way, when the lubricating oil is used as the lubricant to lubricate the linear guide rail 1, the lubricating oil may be supplied from the lubricant supply hole 3b1 directly to the positioning protrusion 5e of the lubrication path component 5 fitted into the positioning hole 3b5, so that the lubricating oil may be easily supplied to the direction change path to achieve a good lubrication.

It should be noted that in a case that the lubrication path component 5 is made of a soft material, when the end cover plate 3b is mounted to the slider 3a, the end cover plate 3b may be pressed to deform the soft lubrication path component 5 so that the circulation component 4 and the lubrication path component 5 may be closely attached to the end cover plate 3b, thereby effectively preventing the leakage of the lubrication oil.

The specific structure of the linear guide rail 1 according to the present disclosure has been described above with reference to the specific embodiments shown in FIG. 1 to FIG. 9.

According to the above description, in order to achieve the object of providing the linear guide rail 1 for easily achieving both the lubricating grease lubrication and the lubricating oil lubrication so as to achieve a good lubrication, the present disclosure provides a linear guide rail 1 including a track 2 including a ball rolling groove 2a on the left and right side surfaces in a longitudinal direction and a moving block 3 relatively movably assembled on the track 2 via a plurality of balls B. The moving block 3 includes: a slider 3a including a loaded ball rolling groove 3a1 arranged opposite to the ball rolling groove 2a so as to form a loaded rolling path for a roll of the ball B, and a non-loaded passage 3a2 formed in parallel with the loaded rolling path and used for the roll of the ball B; an end cover plate 3b fixed to the front and rear end surfaces of the slider 3a; a circulation component 4 provided between the slider 3a and the end cover plate 3b. The linear guide rail 1 is provided with a direction change path for connecting the loaded rolling path and the non-loaded passage 3a2 so as to change a direction of the ball B. The end cover plate 3b is provided with an outer peripheral side direction change portion 3b2 of the direction change path, and the circulation component 4 is provided with an inner peripheral side direction change portion 4a of the direction change path. The circulation component 4 includes a connecting portion 4b for connecting the inner peripheral side direction change portion 4a positioned on the left and right sides of the track 2. The end cover plate 3b includes a fitting recess portion 3b3 for accommodating the connecting portion 4b, and the fitting recess portion 3b3 is formed with a first lubrication groove 3b4. When the lubricating grease is used as the lubricant, the lubricant grease is supplied by a lubricating grease path formed by the first lubrication groove 3b4 and the circulation component 4. The linear guide rail 1 is characterized in that it further includes a lubrication path component 5 including a second lubrication groove 5c having a cross-sectional area less than that of the first lubrication groove 3b4. The lubrication path component 5 includes a fitting portion 5a fitting the first lubrication groove 3b4 and an insertion portion 5b insertable into the circulation component 4. When the lubricating oil is used as the lubricant, the insertion portion 5b is inserted into the circulation component 4 and the fitting portion 5a is fitted into the first lubrication groove 3b4, so that the lubricant is supplied by the lubricating oil lubrication path formed by the first lubrication groove 3b4 and the second lubrication groove 5c.

According to the linear guide rail 1 of the present disclosure, the lubrication path may be widen when the lubricating grease is used to lubricate, while the lubrication path may be narrowed when the lubricating oil is used to lubricate, so that a good lubrication may be easily achieved.

Further, according to the linear guide rail 1 of the present disclosure, by inserting the insertion portion 5b of the lubrication path component 5 into the circulation component 4, the lubricating oil may easily reach the inner peripheral side direction change portion 4a and the outer peripheral side direction change portion 3b2 that constitute the direction change path, so that a good lubrication may be easily achieved.

Preferably, the circulation component 4 includes a third lubrication groove 4c connected to the first lubrication groove 3b4 or the second lubrication groove 5c. When the insertion portion 5b is inserted into the circulation component 4, the insertion portion 5b is inserted into the third lubrication groove 4c.

In this way, when the lubricant is supplied, the lubricant may reliably reach the upper inner peripheral side direction change portion 4a and the lower inner peripheral side direction change portion 4a of the circulation component 4 to lubricate the ball B.

Preferably, a thickness of the insertion portion 5b is formed less than a thickness of the fitting portion 5a when viewed in the longitudinal direction of the track 2.

In this way, the insertion portion 5b of the lubrication path component 5 may be easily inserted into the third lubrication groove 4c of the circulation component 4.

Preferably, the end portion 3b41 of the first lubrication groove 3b4 connected to the outer peripheral side direction change portion 3b2 is formed in a tapered shape, and the end portion Sal of the fitting portion 5a connected to the insertion portion 5b is formed in a tapered shape corresponding to the tapered shape.

By forming the end portion 3b41 of the first lubrication groove 3b4 of the end cover plate 3b connected to the outer peripheral side direction change portion 3b2 into a tapered shape, when the lubricating grease is used to lubricate and flows into the direction change path, a pressure of the lubricating grease may be increased, so that a better lubrication may be achieved.

Preferably, the lubrication path component 5 includes a positioning protrusion 5e for positioning at the end cover plate 3b, and the end cover plate 3b includes a positioning hole 3b5 for fitting the positioning protrusion 5e.

By providing the positioning protrusion 5e and the positioning hole 3b5 as described above, the lubrication path component 5 and the end cover plate 3b may be easily positioned when the lubrication path component 5 is fitted and inserted into the end cover plate 3b.

Preferably, the center of the positioning hole 3b5 coincides with the center of the lubricant supply hole 3b1 provided on the end cover plate 3b.

In this way, when the lubricating oil is used as the lubricant to lubricate the linear guide rail 1, the lubricating oil may be supplied from the lubricant supply hole 3b1 directly to the positioning protrusion 5e of the lubrication path component 5 fitted into the positioning hole 3b5, so that the lubricating oil may be easily supplied to the direction change path to achieve a good lubrication.

Preferably, a part of the second lubrication groove 5c is formed on the positioning protrusion 5e.

In this way, when the positioning protrusion 5e is inserted into the positioning hole 3b5 of the end cover plate 3b, the positioning protrusion 5e may be easily deformed and inserted into the positioning hole 3b5.

Preferably, the rib 5d for preventing the leakage of the lubricating oil may be formed on both sides of the second lubrication groove 5c.

In this way, the leakage of the lubricating oil may be prevented when the lubricating oil is used for lubrication.

Further, the present disclosure provides a lubrication path component, which is the lubrication path component 5 in the linear guide rail 1 according to any one of the embodiments described above.

By using the lubrication path component 5 as described above in the linear guide rail, the linear guide rail may achieve the above technical effects.

It should be noted that, in order to prevent the leakage of the lubricating oil and improve a sealing performance, the third lubrication groove 4c of the circulation component 4 may be filled with an adhesive or the like after the lubrication path component 5 is mounted to the circulation component 4.

As described above, the preferred embodiments of the present disclosure are fully described with reference to the drawings, but those skilled in the art may understand various modifications and variations that should be covered by the present disclosure without deviating from the scope of the technical solution of the present disclosure.

What is claimed is:

1. A motion guiding device comprising a supporting body and a moving body, wherein the supporting body comprises rolling element rolling grooves formed on left and right side surfaces in a longitudinal direction, and the moving body is relatively movably assembled to the supporting body via a plurality of rolling elements,
   the moving body comprises: a moving body main body, a cover body fixed to front and rear end surfaces of the moving body main body; and a circulation component provided between the moving body main body and the cover body, wherein on each of left and right sides in the longitudinal direction, the moving body main body is provided with a loaded rolling element rolling groove and a non-loaded passage, the loaded rolling element rolling groove is arranged opposite to the rolling element rolling groove so as to form a loaded rolling path, and the non-loaded passage is formed in parallel with the loaded rolling path,
   the motion guiding device is provided with a direction change path for connecting the loaded rolling path and the non-loaded passage so as to change a direction of the rolling elements, the cover body is provided with an outer peripheral side direction change portion of the direction change path, and the circulation component is provided with an inner peripheral side direction change portion of the direction change path,
   the circulation component comprises a connecting portion for connecting inner peripheral side direction change portions positioned on left and right sides of the supporting body, the cover body comprises a fitting recess portion for accommodating the connecting portion, and a first lubrication groove is formed in the fitting recess portion,
   when a lubricating grease is used as a lubricant, the lubricant is supplied by a lubricating grease lubrication path formed by the first lubrication groove and the circulation component, when a lubricating oil is used as a lubricant, the motion guiding device further comprises a lubrication path component, the lubrication path component comprising a second lubrication groove having a cross-sectional area less than that of the first lubrication groove, the lubrication path component comprises a fitting portion fitting the first lubrication groove and an insertion portion insertable into the circulation component, and by inserting the insertion portion into the circulation component and fitting the fitting portion into the first lubrication groove, the lubricant is supplied by a lubricating oil lubrication path formed by the first lubrication groove and the second lubrication groove.

2. The motion guiding device according to claim 1, characterized in that the circulation component comprises a third lubrication groove connected to the first lubrication groove or the second lubrication groove, and when the insertion portion is inserted into the circulation component, the insertion portion is inserted into the third lubrication groove.

3. The motion guiding device according to claim 1, characterized in that a thickness of the insertion portion is formed less than a thickness of the fitting portion when viewed in the longitudinal direction.

4. The motion guiding device according to claim 3, characterized in that an end portion of the first lubrication groove connected to the outer peripheral side direction change portion is formed in a tapered shape, and an end portion of the fitting portion connected to the insertion portion is formed in a tapered shape corresponding to the tapered shape of the end portion of the first lubrication groove.

5. The motion guiding device according to claim 4, characterized in that the lubrication path component comprises a positioning protrusion for positioning in the cover body, and the cover body comprises a positioning hole for fitting the positioning protrusion.

6. The motion guiding device according to claim 5, characterized in that a center of the positioning hole coincides with a center of a lubricant supply hole provided in the cover body.

7. The motion guiding device according to claim 5, characterized in that a part of the second lubrication groove is formed on the positioning protrusion.

8. The motion guiding device according to claim 1, characterized in that a rib for preventing a leakage of the lubricating oil is formed on both sides of the second lubrication groove.

* * * * *